United States Patent [19]
Duta et al.

[11] Patent Number: 5,502,882
[45] Date of Patent: Apr. 2, 1996

[54] 90 DEGREE SPEED REDUCER ASSEMBLY, PROCESS, AND MEASURING MACHINE

[75] Inventors: Oprea Duta, St. Louis; Randy R. Prom, St. Charles, both of Mo.

[73] Assignee: Emerson Electric Co., St. Louis, Mo.

[21] Appl. No.: 55,222

[22] Filed: Apr. 30, 1993

[51] Int. Cl.$^6$ ................................................. B23Q 17/00
[52] U.S. Cl. ............................................... 29/407.05
[58] Field of Search .............................. 29/407; 74/424.5

[56] References Cited

U.S. PATENT DOCUMENTS

| | | |
|---|---|---|
| 3,708,857 | 1/1973 | Pfeiffer ........................... 29/407 |
| 4,020,715 | 5/1977 | Sollars . |
| 4,261,218 | 4/1981 | Eagan, Sr. . |
| 4,951,519 | 8/1990 | Ob . |

FOREIGN PATENT DOCUMENTS

| | | |
|---|---|---|
| 0250844 | 1/1988 | European Pat. Off. . |
| 3416563 | 11/1984 | Germany . |
| 4337144 | 5/1991 | Japan . |

*Primary Examiner*—Joseph M. Gorski
*Attorney, Agent, or Firm*—Polster, Lieder, Woodruff & Lucchesi

[57] ABSTRACT

A method of assembling a speed reducer assembly including a housing having a front wall or side defining a bearing shoulder having an inner surface, a back wall or side defining an opening and having an outer face; a bracket having an inner surface which rests against the back wall face to close the back wall opening and defining a second bearing shoulder having an inner surface, a worm and a worm gear held in meshing contact in the housing, and front and back shims which align the center of curvature of the worm gear with the axis of the worm. The method of aligning the worm and worm gear includes the steps of predetermining the width of the shims and then assembling the speed reducer assembly. To predetermine the width of the shims, the distance from the center of curvature of the worm gear to an axially outer surface of the worm gear assembly is determined. A gauge is provided to determine this distance.

8 Claims, 3 Drawing Sheets

90 DEGREE SPEED REDUCER ASSEMBLY, PROCESS, AND MEASURING MACHINE

BACKGROUND OF THE INVENTION

This invention relates to speed reducers, and in particular, to a method of assembling 90° speed reducers.

Speed reducer assemblies are widely used for applications in which a rotational speed, such as an output from a motor, is reduced to perform an intended function. Speed reducers commonly include a housing which supports a worm and a worm gear in meshing contact. In a 90° reducer, the axis of the worm gear output shaft is perpendicular to the worm.

To increase the useful life of a reducer assembly, it is important for the center of the worm to be aligned as closely as possible to the plane of the center of curvature of the worm gear. If the worm is offset from the center of curvature of the worm gear to any appreciable degree, the worm will prematurely wear down the worm gear, reducing the life of speed reducer assembly. Because the center of curvature of the worm gear does not necessarily coincide with the center of the worm gear plate, properly positioning the gear in the housing is difficult.

The majority of 90° speed reducers presently used have a housing which supports the worm through side walls. The front and back of the housing define openings which are closed by brackets which support bearings of the worm gear assembly. To appropriately position the worm gear in these assemblies requires a hit and miss method. This method includes placing shims of an anticipated depth between the housing and bracket and then securing the bracket to the back wall of worm gear assembly bearing. The position of the worm gear in relation to the worm is then checked. If the position is not right, the assembly is taken apart, shims are removed or added, as needed, and the assembly is put back together. This procedure is repeated until the worm gear is properly positioned with respect to the worm.

Once the worm gear is properly positioned, an anticipated number of shims are placed in the front bracket and the front bracket is secured to the assembly to close it. The output shaft, which extends out the front of the assembly will have some axial movement. This axial movement must be within certain tolerances. The movement, or end play, must then be determined. If it is outside of the tolerances, the bracket must be removed, shims removed or added as needed, and then the bracket is reattached. The end play of the output shaft is then checked, and if not within tolerances, the process is repeated until the end play is within tolerances. As can be imagined, this process can require a substantial amount of labor, increasing the cost of the assembly. Further, the measurements are prone to human error, and two people may put together the same assembly with different shim depths.

The shims that are used in the above described assembly are actually made of a plurality of shim pieces of a predetermined thickness. The appropriate sized shims are placed together in the assembly to arrive at the proper shim thickness. These shims have an outer periphery that is coextensive with the periphery of the front and back brackets. The bolts which secure the brackets to the housing therefore pass through the shims, necessitating total removal of the bracket when the shim depth must be changed during assembly of speed reducers.

A housing having a closed front and open back (i.e., having one removable bracket) has been produced. This assembly, however, only allows for the adjustment of shims on the removable bracket. The worm gear assembly includes the shaft, worm gear, spacers, and bearing assemblies all of which have tolerances. These tolerances are stacked when the worm gear assembly is put together. This speed reducer assembly, unlike the above described assembly, does not allow for compensation of these tolerances. Therefore it is nearly impossible to properly align the worm and worm gear of this assembly.

Speed reducer assemblies have been provided which attempt to aid in the proper alignment of the worm and worm gear of the speed reducer. U.S. Pat. No. 4,261,218, to Eagan, Sr., discloses a speed reducer assembly which has a threaded adjuster, which when rotated, axially moves the input shaft. This will move the worm relative to the worm gear to minimize or eliminate back lash between the worm and worm gear. However, it will not eliminate the trial and error inherent the assembly of 90° worm gear speed reducers.

SUMMARY OF THE INVENTION

One object of the invention is to provide a 90° speed reducer.

Another object is to provide such a speed reducer wherein the worm and worm gear are accurately positioned.

Another object is to provide a method for accurately positioning the output shaft assembly containing the worm gear with respect to the worm.

Another object is to provide such a method which substantially reduces the human error involved in the assembly process.

Another object is to provide a machine or gauge for determining the distance center of curvature of the worm gear to an axially outer surface of the output shaft assembly.

These and other objects will become apparent to those skilled in the art in light of the following disclosure and accompanying drawings.

In accordance with the invention, generally stated, a two step method for assembling a speed reducer assembly is disclosed. The speed reducer assembly includes a housing having a front wall or side defining a bearing shoulder having an inner surface, a back wall or side defining an opening and having an outer face; a bracket having an inner surface which rests against the back wall face to close the back wall opening and defining a second bearing shoulder having an inner surface, a worm and a worm gear held in meshing contact in the housing, and front and back shims which align the center of curvature of the worm gear with the axis of the worm. The method includes the steps of predetermining the width of the shims and then assembling the speed reducer assembly.

The width of the shims is determined by determining the difference in between the distance from the ends of the bearing assemblies of the worm gear assembly and the distance between the bearing shoulders of the housing. To determine this the bracket is placed in a bracket gauge, which is operatively connected to a computer, to determine the distance (H) between the bracket inner surface and the second bearing inner surface and outputting the distance H to the computer. The housing is placed in a housing gauge, which is operatively connected to the computer, to determine the distance (M) from the surface of the first bearing shoulder to the back surface face and outputting the distance M to the computer. The worm gear assembly is placed in a third gauge, which is operatively connected to the computer, to determine the distance (L) from an outer side of a first bearing assembly of the worm gear assembly to an outer side of a second bearing of the worm gear assembly, and the distance (L1) from the outer side of one of the bearing assemblies to the center of curvature of the worm gear, and outputting the distances L and L1 to the computer. The distance (N) from the face of the back wall to the axis of the worm and the end play tolerance EP of the worm gear shaft are known distances or tolerances and are stored in the computer. These distances, however, could be measured, the measurements then being input to the computer.

The end play tolerance, EP, can have a positive value or a negative value. In the former case, the output shaft will have some axial movement when the speed reducer is assembled. In the latter case (known as pre-load), the distance between the outer surfaces of the bearing assemblies is greater than the distance between the bearing shoulders of the housing when the housing is assembled. That is, the distance L is greater than the distance M+H. This requires that the bearing assemblies be compressed, or urged toward each other for assembly. When assembled, the output shaft will not move axially if a pre-load condition exists.

The shim widths S1 and S2 are then determined according to the equations $$S1=M-N-L1-EP/2, \text{ and}$$

$$S2=M+H-L-EP-S1.$$

The distance L1 is the distance between the center of curvature of the worm gear and an axial outer surface of the output shaft or worm gear assembly. The third gauge determines the distances L and L1 by moving the worm gear perpendicularly to the axis of the worm, and finding the position of the worm gear with respect to the worm wherein the center of the worm is at a vertical minimum.

The third gauge includes a first frame having an axially movable base, a pair of support blocks configured to receive the bearing assemblies, and stop plates secured to outer edges of the blocks to prevent axial movement of the worm gear assembly with respect to the first frame. A second frame supports a worm, preferably a master worm, in meshing contact with the worm gear. A linear transport system moves the first frame relative to the second frame to move the worm gear perpendicularly with respect to the worm axis. Linear transducers are used to determine the vertical position of the worm axis and the horizontal position of the worm gear as the first frame is moved.

DESCRIPTION OF THE PREFERRED EMBODIMENT

Figure 1:
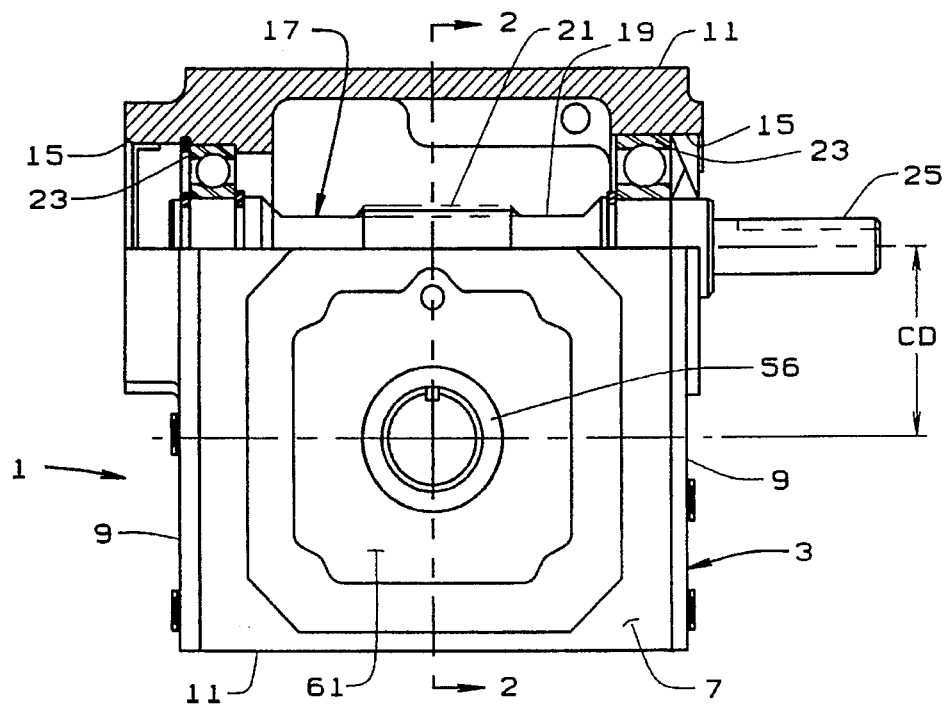
FIG. 1 is a rear elevational view, partly in cross-section, of a 90° speed reducer assembly of the present invention.
Figure 2:
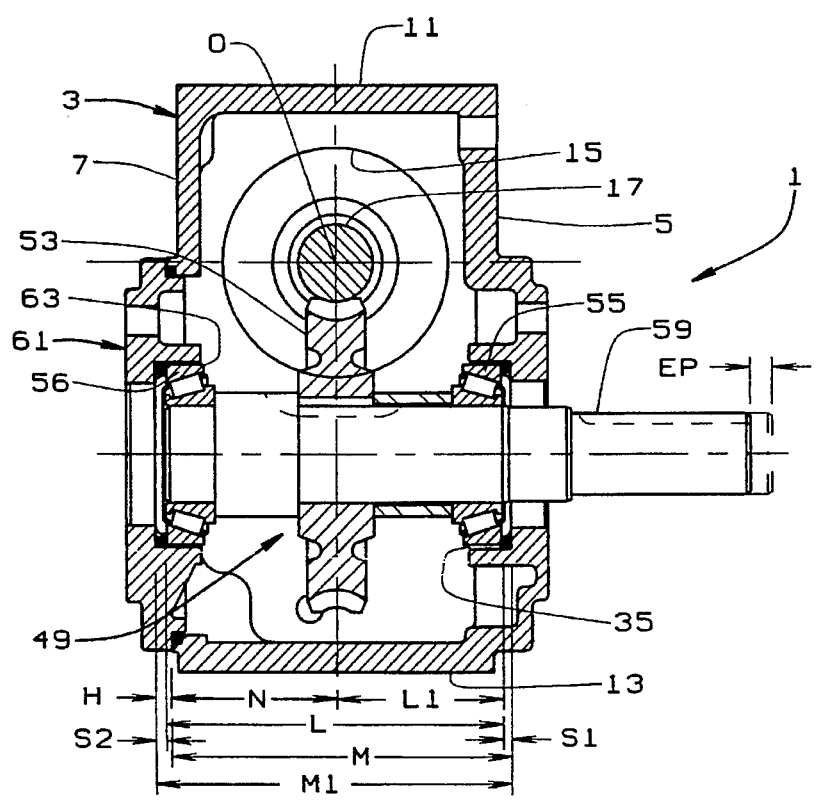
FIG. 2 is a cross-sectional view of the speed reducer taken along line 2—2 of FIG. 1.
Figure 3:
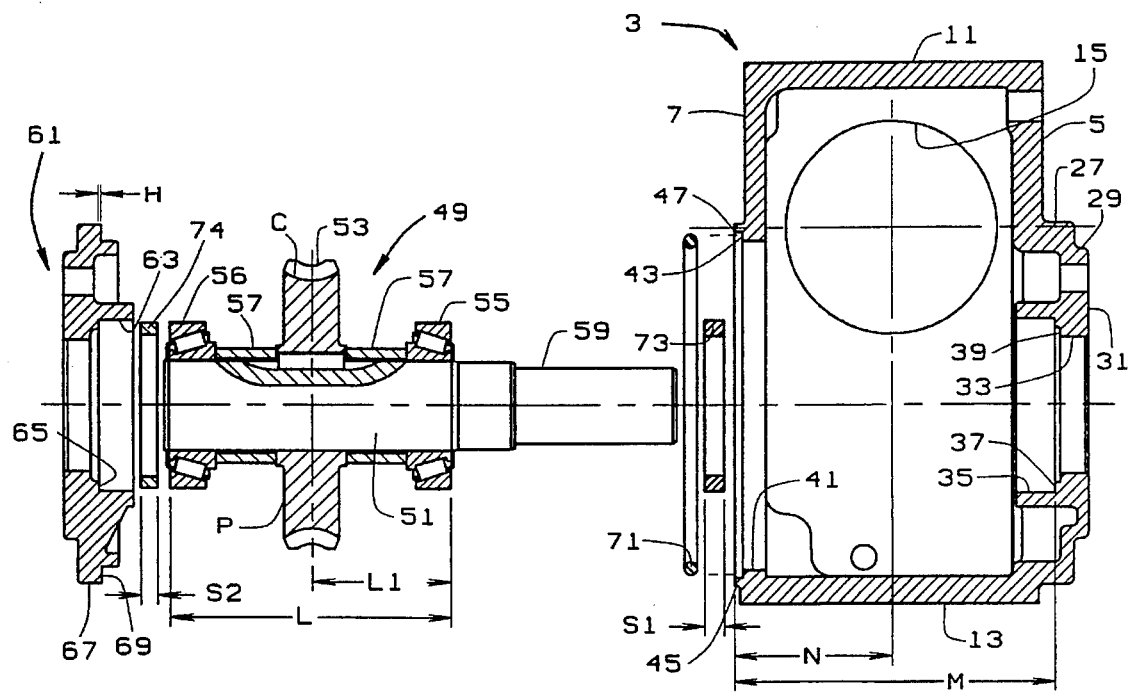
FIG. 3 is an exploded cross sectional view of the housing, worm gear assembly, and a bracket of the speed reducer assembly with the worm missing.

Referring initially to FIGS. 1–3, a 90° speed reducer assembly is generally referred to by reference numeral 1. Although this description is directed toward a 90° speed reducer, it will be understood that it is applicable to other designs of speed reducer assemblies. Assembly 1 includes a housing 3 having a front wall or side 5, a back wall or side 7, side walls 9, a top 11 and a bottom 13. Side walls 9 have openings 15 in axial alignment to receive a worm assembly 17. Worm assembly 17 includes a shaft 19, a worm 21 formed on shaft 19, and two bearing assemblies 23 through which shaft is rotatably journaled. Openings 15 are sized to receive bearing assemblies 23 which are secured against axial movement. A portion 25 of shaft 19 extends outwardly of housing 3 to be connected to a motor output shaft or another rotatable member to drive the worm shaft, as is known.

Front wall 5 is stepped outwardly, as at 27 and 29, to define a front surface 31. An opening 33 is formed in surface 31. An inwardly extending annular flange 35 is radially spaced from opening 33. A bearing shoulder 37 is formed inside of flange 35 at its base, and is stepped as at 39 to opening 33.

Back wall 7 defines an opening 41. A shoulder 43 is formed around opening 41 on an outer surface of back wall 7. A flange 45 extends outwardly from shoulder 43 and defines an annular face 47.

A worm gear assembly 49 is received in housing 3 and is introduced through back wall opening 41. Worm gear assembly 49 includes a shaft 51, a worm gear 53 which is rotationally fixed to shaft 51, and front and back bearing assemblies 55 and 56. Bearing assemblies 55 and 56 are spaced from gear 53 by spacers 57. Shaft 51 includes a front portion 59 which forms an output shaft. When assembly 49 is introduced into housing 3, front bearing assembly 55 is received within flange 35, with the output shaft 59 extending through opening 33. The back bearing assembly 56 is supported by a bracket 61. Opening 33 is vertically spaced from opening 15 a distance sufficient to allow worm gear 53 to mesh with worm 21. Shims 73 are placed in the housing within flange 35 prior to the introduction of worm assembly 49 thereinto.

Bracket 61 includes an inwardly extending annular wall 63 having a bearing shoulder 65 which receives rear bearing assembly 56 to support worm gear assembly 49. Shims 74 are also received in bearing shoulder 65. Shoulder 65 is axially aligned with bearing shoulder 37. A circular flange 67 extends substantially outwardly from bracket 61 and includes an inner face 69. Face 69 rests against flange surface 47 of back surface 7 when assembly 1 is put together. To seal assembly 1, an O-ring 71 is received in shoulder 43 surrounding back wall opening 41.

As can be seen in FIGS. 2 and 3, worm gear 53 has a curvature C. For the reducer assembly 1 to operate smoothly, and to maximize its useful life, the worm 21 must mesh with worm gear 53 as close as possible to the center of curvature of gear 53. Worm 21 is substantially fixed, thus, the worm gear assembly is maneuvered to properly align the worm and worm gear. To accomplish this, front and back shims 73 and 74 are used. Front shim 73 is positioned between shoulder 37 and front bearing 55, and rear shim 74 is positioned between bracket shoulder 65 and rear bearing 56.

Shims 73 and 74 are not single pieces, rather, they are made up of a plurality of thin rings of predetermined thicknesses. A plurality of rings are placed together to produce the appropriate shim width. Shims 73 and 74 are preferably annular rings that have an outer diameter slightly less than the inner diameter annular walls 35 and 65 to fit within walls 35 and 65. To prevent the trial and error method of aligning the worm gear and worm the width S1 and S2 of shims 73 and 74 respectively, must be known in advance. The combined width of the shims is essentially the difference in (1) the distance between housing shoulder 37 and bracket shoulder 65, and (2) the distance between axially outer surfaces of the worm gear assembly, typically the outside faces of bearing assembly 55 and 56. Because the center of curvature of gear 53 is not necessarily at the center of the distance between the outer surfaces of the worm gear assembly, this distance (1)–(2) cannot be divided in two to arrive at the appropriate shim widths. Rather, the widths of the shims are determined by the equations:

$$S1 = M - N - L1 - EP/2 \quad (1)$$

$$S2 = M + H - L - EP - S1 \quad (2)$$

where

S1=the width of shim 73;

S2=the width of shim 74;

M=the distance between housing shoulder 37 and back face 47;

N=the distance between worm center O and back face 47;

L1=the distance from the outer face of front bearing assembly 55 to the center of curvature of worm gear 53;

L=the distance between the outer faces of bearing assemblies 55 and 56;

H=the distance between bracket shoulder 65 and bracket inner face 69; and

EP=the end play or pre-load tolerance of axial movement of worm shaft 51. End play has a positive value and pre-load has a negative value.

Figure 8:
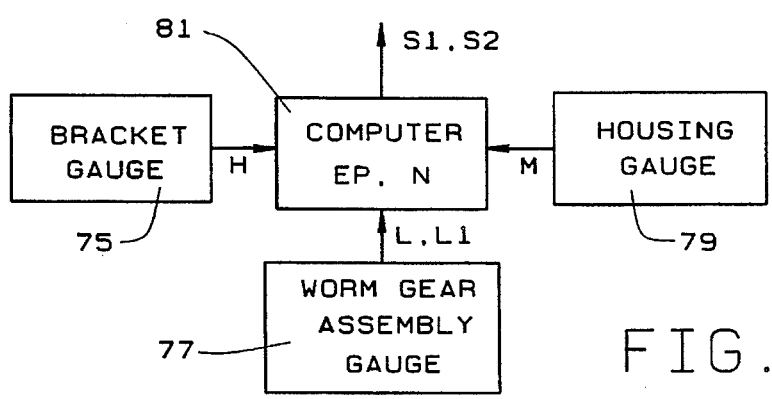
FIG. 8 is a block diagram of the stations used to measure the components of the speed reducer assembly to determine the width of shims to be used.

EP and N are generally known distances. To determine S1 and S2, the bracket 61, worm gear assembly 49 and housing 3 are placed in gauges 75, 77, and 79, all of which are operatively connected to a computer 81. (FIG. 8) Bracket gauge 75 measures the distance H and outputs it to the computer; housing gauge 79 measures distance M and outputs it to the computer; and worm gear assembly gauge measures L1 and L and outputs them to the computer. The computer then takes these values (the values of N and EP having been previously stored in the computer), and determines the appropriate width of shims 73 and 74 according to equations (1) and (2). With these values determined by the computer, the appropriate shims pieces can be gathered to assemble shims 73 and 74. The reducer assembly 1 can then be put together in a single step without the human error involved in the trial and error method of the prior art. As can be appreciated, this can dramatically reduce the assembly time and labor involved in producing the speed reducers. Although the process has been described with respect to a housing having one closed side and one open side, it is also applicable to a speed reduce housing having two open sides. In this case, the housing would have two brackets 61. If such a housing were used, one of the brackets could be secured to one of the sides before the housing is inserted in the housing gauge. After this, the remainder of the procedure is the same as set out above. The procedure has also been described as using the outer faces of the bearing assemblies 55 and 56 as reference points in determining the distance L and L1. Although this is preferred because the bearing assemblies will usually be supported by bearing flanges as shown in the drawings, any axial outer surface, such as the ends of the worm gear shaft 49 can be used as reference points to determine the distances L and L1.

Figure 4:
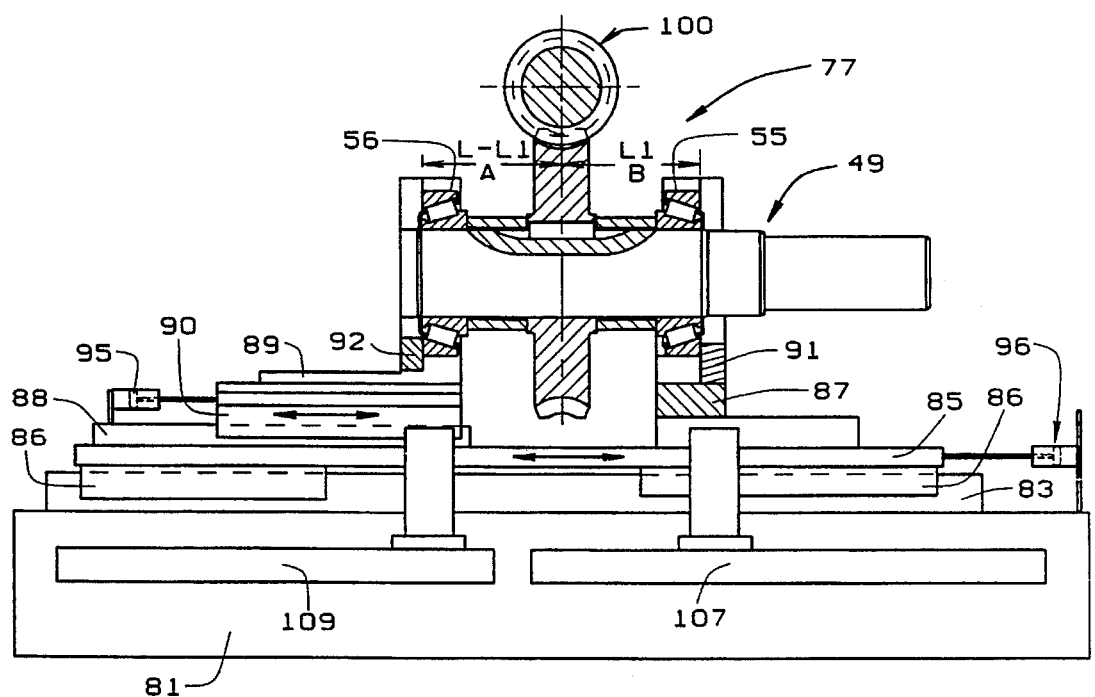
FIG. 4 is a front elevational view, partly in cross-section, of a gauge used to determine the distance between the center of curvature of the worm gear and an axial outer surface of the worm gear assembly.
Figure 5:
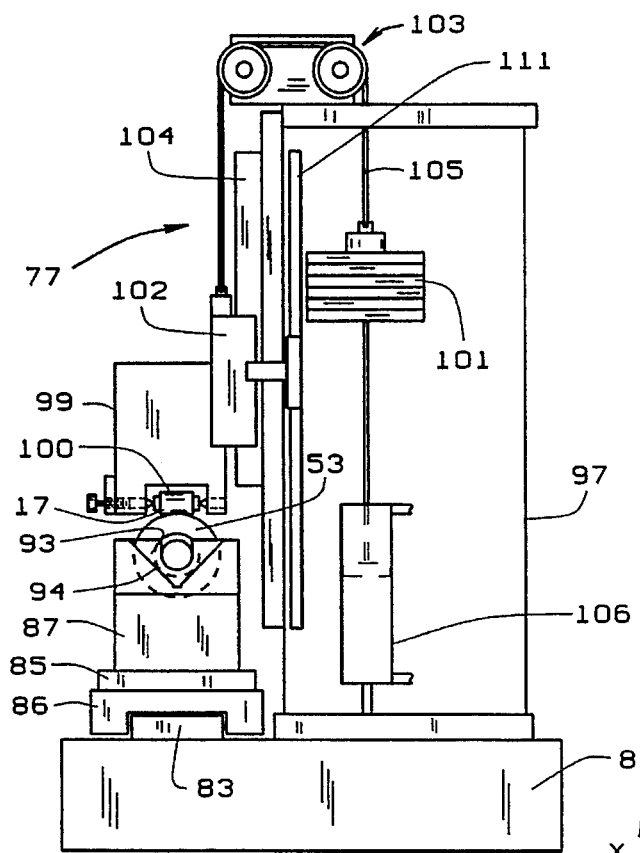
FIG. 5 is a side elevational view of the gauge.

Bracket gauge 75 and housing gauge 79 may be a linear encoders, or any other measuring device that will determine the distances H and M. Because the center of curvature of the worm gear is not necessarily in line with the center of the worm gear plate, the distance L1 cannot be determined with a simple measuring device. A preferred embodiment of gauge 77 is shown in FIGS. 4 and 5.

Gauge 77 includes a base 81 having a track 83. A table 85 is mounted on slides 86. Slides 86 are slidably mounted on a track 83. Table 85 can thus move longitudinally relative to base 81 along the path defined by track 83. Front support block 87 is mounted to table 85. Back support block 89 is mounted to a slide 90. Each block includes a "V" shaped notch 94 (FIG. 5) which receives the front and back bearing assemblies of worm gear assembly 49. Stop plates 91 and 92 are secured to the outer faces of blocks 87 and 89 to hold assembly 49 in place. Each stop plate has a "U" shaped cut out 93 which has approximately the same diameter as the outer ring of the bearing assemblies to accommodate the output shaft 59. The inner faces of the stop plates 91 and 92 press against the outer surfaces of bearing assemblies 55 and 56 to clamp the worm gear assembly in place, preventing axial movement of the worm gear assembly relative to table 85.

To securely support assembly 49 on table 85, support block 89 is movable axially with respect to table 85, giving the block 89 its clamping capabilities. Block 87 is fixed to table 85 and is not movable. This also allows the gauge 77 to accommodate various sized worm gear assemblies. A rail 88 having a slide 90 is mounted in table 85. Block 89 is mounted on slide 90 so that the block can be moved laterally with respect to table 85. A piston 95, linear actuator, or other linear motion system, is operatively attached to rear block 89 to control the movement thereof to clamp worm gear assembly 49 in place and to maintain it in a clamped position. When gear assembly 49 is placed on blocks 87 and 89, rear block 89 can be moved axially forward (to the right as shown in FIG. 4) to securely hold assembly 49 in place to prevent axial movement of assembly 49 with respect to table 85 while the gauge 77 is operating. A linear actuator 96 is mounted on base 81 and operatively connected to table 85 to move table 85 with respect to base 81 for a purpose discussed below.

A vertical support or column 97 (FIG. 5) is secured to base 81 and includes a bracket 99 which holds a master worm 100 above worm gear 53. Bracket 99 is mounted on a slide 102 which slides on a rail 104 mounted to column 97, so that master worm 100 may be moved vertically toward and away from worm gear assembly 49. Weights 101 are attached to bracket 99 by way of a pulley system 103 and cord 105. Weights 101 carry sufficient weight to offset a majority of the weight of worm 27 placed on worm gear 53, to control the meshing pressure of master worm 100 with worm gear 53. If too much pressure is applied, worm 100 will not be able to freely move in response to movement of the worm gear. If not enough pressure is applied, master worm 100 will not be moved by the worm gear as it is moved. Counterweight 101 therefore carries sufficient weight to allow master worm 100 to mesh with worm gear 53 so that it can freely rotate in response to movement of worm gear 53. The weight contained on counterweight 101 may be altered to accommodate the weights of different master worms. This allows for more versatility of gauge 77 in measuring the parameters of a broad variety of worm gear assemblies.

A linear actuator 106 is mounted on base 81 and operatively connected to weights 100 and is used to raise master worm 100 in bracket 99 so that worm gear assembly 49 may be places in V-blocks 87 and 89. Once worm gear assembly 49 is in place, master worm is lowered to mesh with the worm gear 100. The worm 100 may be lowered using only weights 101, or by use of linear actuator 106.

Lastly, gauge 77 includes at least three linear encoders 107, 109, and 111. Linear encoder 107 and 109 are connected to V-blocks 87 and 89 respectively to locate the position of the worm gear relative to a starting or "0" point to determine the distances L and L1. Encoder 107 measures the distance from the center of curvature of worm gear 53 to the outer face of bearing assembly 55 to determine L1. Encoder 109 measures the distance between the center of curvature of worm gear 53 and the outer face of bearing assembly 56 to determine distance L–L1. By adding the two numbers together, the distance L is determined. Linear encoder 111 is fixed to slide 102 to determine the vertical position of the master worm 100. As is explained below, the position of worm gear 53 when master worm 100 is at a low point is used to determine L and L1.

Figure 6:
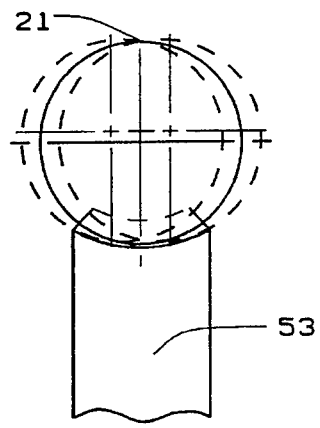
FIG. 6 is a diagrammatic representation of the method used to determine the center of curvature of the worm gear.

Because the worm gear has a curvature C, as the master worm 100 is moved along the worm gear curvature it will follow a generally arcuate shaped pattern as can be seen in FIG. 6. The center of curvature of gear 53 is the point where master worm 100 is at its lowest point.

Using gauge 77, the low point of the arcuate shaped path traveled by the worm can be determined in several ways. When the worm and worm gear in place, table 85 is slowly moved by a linear motion system 96, such as a screw, piston, or other linear actuator. Master worm 100 is horizontally fixed; it can only move vertically. Thus, as table 85 is moved, master worm 100 is raised and lowered as it follows the curvature of gear 53. Encoder 111 measures the vertical or Y position of the center of worm 21 as the table is moved. Further, as table 85 moves, the distance between the center of master worm 100 (which remains horizontally fixed) to the outside faces of bearing assemblies 55 and 56 changes. These distances are shown as A and B in FIG. 4. Encoder 107 measures distance B and encoder 109 measures distance A. A+B=L, thus, the combined distance of A and B will be constant.

Figure 7:
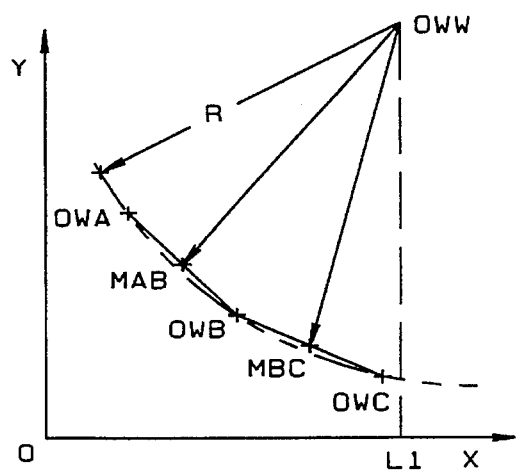
FIG. 7 is a chart plotting the elevation of a worm against the horizontal position of the worm gear to determine the distance from the center of curvature of the worm gear to the outer axial surface of the worm gear assembly.

As can be seen in FIG. 7, when Y is plotted against B (X on the graph), points on the curvature of gear 53 are produced. By taking any three points (A, B, and C) secants AB and BC may be drawn. By drawing a line perpendicular to the secants, from the midpoints of the secants, the center of curvature of the worm OWW is found at a point where the lines intersect. The B (or X) coordinate of point OWW will provide the distance L1. The greater the number of points that are taken, the greater the accuracy of the determination of point OWW will be and hence the determination of the distances L and L1. The A coordinate of point OWW is determined in the same manner as the B coordinate and provides the distance L–L1 so that the distance L may be determined.

The use of the computer 81 allows for the use of many points so that a more accurate center of curvature (L1) can be found. The center of curvature is determined from the following equations for points A, B, and C having coordinates $A(X_A,Y_A)$, $B(X_B,Y_B)$, and $C(X_C,Y_C)$.

$Y_A$=L1 A $Y_{B=L1}$ B $Y_C$=L1 C

The equation for the line AB is $$Y=SL_{AB}X+K_{AB}$$

wher $$SL_{AB}=\frac{Y_A-Y_B}{X_A-X_B}$$

and $$K_{AB}=Y_A-\frac{Y_A-Y_B}{X_A-X_B}X_A$$

The equation for the line BC is:

$$Y=SL_{BC}X+K_{B\ C}$$

where $$SL_{BC}=\frac{Y_B-Y_C}{X_B-X_C}$$

and $$K_{BC}=Y_B-\frac{Y_B-Y_C}{X_B-X_C}X_B$$

The line AB has a midpoint $M_{A\ B}$ with coordinates $(X_{M\ A\ B}, Y_{M\ A\ B})$ and the line BC has a midpoint $M_{B\ C}$ with coordinates $(X_{M\ B\ C}, Y_{M\ B\ C})$.

where $X_{M\ A\ B}=(X_A+X_B)/2$ $Y_{M\ A\ B}=(Y_A+Y_B)/2$ $X_{M\ B\ C}=(X_B+X_C)/2$ and $Y_{M\ B\ C}=(Y_B+Y_C)/2$ The equation for the line $M_{A\ B}\ O_{W\ W}$ perpendicular to line AB through point $M_{A\ B}$ is $$Y=\frac{1}{-SL_{AB}}X+K_{MAB}$$

where $$K_{MAB}=Y_{MAB}+\frac{1}{-SL_{AB}}X_{MAB}$$

The equation for the line $M_{B\ C}O_{W\ W}$ perpendicular to line BC through point $M_{A\ B}$ is $$Y=\frac{1}{-SL_{BC}}X+K_{MBC}$$

where $$K_{MBC}=Y_{MBC}+\frac{1}{-SL_{BC}}X_{MBC}$$

The first center of curvature $O_{A\,B\,C}$ is:

$$L_{11} = X_{OABC} = \frac{K_{MBC} - K_{MAB}}{\frac{1}{-SL_{AB}} + \frac{1}{-SL_{BC}}}$$

making all the substitutions, $$L_{11} = \frac{\frac{Y_B + Y_C}{2} + \frac{X_B - X_C}{Y_B - Y_C} \cdot \frac{X_B + X_C}{2} - \frac{Y_A + Y_B}{2} - \frac{X_A - X_B}{Y_A - Y_B} \cdot \frac{X_A + X_B}{2}}{-\frac{X_A - X_B}{Y_A - Y_B} + \frac{X_B - X_C}{Y_B - Y_C}}$$

For a plurality of center of curvatures $L_{1\,1}$ to $L_{1\,n}$, the center of curvature $L_1$ is:

$$L_1 = \frac{L_{11} + L_{12} + L_{13} + \ldots + L_{1n}}{n}$$

The distance L1 can also be determined by plotting Y v. B at small increments from one edge of the worm gear to the other. The center of curvature will be the lowest position of the worm gear. From this position, the B coordinate will provide the distance L1.

Alternatively, if table 85 can slide on track 83 virtually friction free, the weight of master worm 100 on the curvature of worm gear 53 will cause the table to slide from side to side. The worm will come to rest at its lowest point, providing the center of curvature of gear 53. At this point, measurements can be taken to determine L and L1.

As can be seen, gauge 77 provides a simple method of determining the distance from the center of curvature of a worm gear to an axial outer face of the worm gear assembly. This facilitates a quick and simple determination of the appropriate shim widths to use to properly position a worm gear with respect to a worm to provide a maximum life span of the reducer assembly.

The foregoing descriptions set forth for illustrative purposes only. Numerous variations within the scope of the appended claims will be apparent to those skilled in the art. Although the use of gauge 77 is described for use with a master worm, the production worm may also be used as the testing worm to determine the distance L1. This variation is merely illustrative.

We claim:

1. A method of assembling a speed reducer assembly;

the speed reducer assembly including:

a housing, the housing having front side, a flange extending inwardly from said from side, a back side, an opening formed in the back side, said back side having an outer face;

a bracket having an inner surface which rests against said back side outer face to close said back side opening, said bracket including a second flange extending inwardly from said bracket inner surface and defining a bearing shoulder positioned within said flange, said bearing shoulder having an inner surface;

a pair of bearing assemblies supported by respective ones of said flanges, a worm gear assembly including a shaft and a worm gear fixed on the shaft, said shaft being rotatably journaled in said bearing assemblies;

a worm held in meshing contact with said worm gear, said worm having an axis of rotation; and front and back shims positioned in an area defined by said flanges which align the center of curvature of said worm gear with the axis of rotation of said worm;

the method including the steps of predetermining the width of said shims necessary to substantially align the center of curvature of said worm gear with said worm axis in said speed reducer assembly in an unassembled condition of said speed reducer assembly; and assembling said speed reducer assembly;

said step of predetermining said width of said shims including the steps of:

a) measuring the distance (L) from an outer side of a first bearing of said worm gear assembly to an outer side of a second bearing of said worm gear assembly;

b) measuring the distance (L1) between the outer side of one of said bearing assemblies to the center of curvature of said worm gear;

c) determining the distance (H) between said bracket inner surface and said bearing shoulder inner surface;

d) measuring the distance (M) from the surface of said first bearing shoulder to said back side outer face;

e) supplying the distance (N) from the face of said back side to the axis of said worm and one of the end play and the pre-load tolerance (EP) of the worm gear shaft;

f) calculating the shim widths S1 and S2, wherein dimension (S1) is equal to M–N–L1–EP/2, and dimension (S2) is equal to M+H–L–EP–S1; and assembling said speed reducer assembly, said step of assembling said speed reducer assembly including mounting said bearing assemblies, said worm gear assembly and said shims in said housing and bracket such that said worm gear shaft is rotatably journaled in said bearing assemblies, said bearing assemblies are positioned in said flanges, said front shim having said dimension S1 is positioned between said housing front side and a first of said bearing assemblies, and said back shim having said dimension S2 is positioned between said bearing shoulder inner surface and a second of said bearing assemblies; and securing said bracket to said housing.

2. The method of claim 1 wherein the steps of determining the distances H, M, L, and L1 comprise the steps of placing said bracket in a bracket gauge, placing said housing in a housing gauge, and placing said worm gear assembly in a third gauge.

3. The method of claim 1 wherein determining the distance L1 includes said step of determining the distance to the center of curvature of said worm gear from said axial outer surface of said worm gear assembly.

4. The method of claim 3 wherein said distance L1 is measured from an outer surface of one of said bearing assemblies of said worm gear assembly.

5. The method of claim 3 wherein said step of determining the distance to the center of curvature of said worm gear from the outer surface of said worm gear assembly includes placing a testing worm in meshing contact with said worm gear; moving said worm gear relative to said testing worm under the pressure from said testing worm; and measuring the placement of said worm gear when said worm gear stops moving.

6. The method of claim 5 wherein said step of moving said worm gear is performed by lowering said testing worm onto said worm gear, the pressure of said testing worm moving said worm gear.

7. The method of claim 3 wherein said step of determining the distance from the center of curvature of said worm gear to said outer axial surface includes placing a testing worm on said worm gear to be in meshing contact therewith, moving said worm gear perpendicularly to the axis of said testing worm, and finding the position of said worm gear with respect to said testing worm wherein the center of said testing worm is at a vertical minimum.

8. The method of claim 3 wherein said step of determining the distance from the center of curvature of said worm gear to said axial outer surface includes placing a testing worm on said worm gear gauge to be in meshing contact with said worm gear; moving said worm gear perpendicular to the axis of said testing worm; determining the vertical position (Y) of the testing worm and the horizontal position (X) of said worm gear at least three points (A, B, and C); determining the midpoints (MAB) and (MBC) of the lines AB and BC, respectively; and determining the horizontal position of the point where lines perpendicular to lines AB and BC which pass through the points MAB and MBC intersect.

* * * * *